United States Patent
Grunder et al.

(10) Patent No.: US 10,369,633 B2
(45) Date of Patent: Aug. 6, 2019

(54) CUTTING TOOL FOR MACHINING ABRASIVE MATERIALS, NOTABLY WOOD-BASED MATERIALS

(71) Applicant: DIAMONDE, Marlenheim (FR)

(72) Inventors: Timothée Grunder, Rosheim (FR); Anne Piquerez, Kirchheim (FR)

(73) Assignee: DIAMONDE, Marlenheim (FR)

( * ) Notice: Subject to any disclaimer, the term of this patent is extended or adjusted under 35 U.S.C. 154(b) by 0 days.

(21) Appl. No.: 15/568,138

(22) PCT Filed: Apr. 21, 2016

(86) PCT No.: PCT/FR2016/050939
§ 371 (c)(1),
(2) Date: Oct. 20, 2017

(87) PCT Pub. No.: WO2016/177952
PCT Pub. Date: Nov. 10, 2016

(65) Prior Publication Data
US 2018/0147638 A1  May 31, 2018

(30) Foreign Application Priority Data
Apr. 22, 2015  (FR) ...................... 15 53584

(51) Int. Cl.
*B23B 27/14* (2006.01)
*B23B 27/18* (2006.01)
(Continued)

(52) U.S. Cl.
CPC ............ *B23B 27/18* (2013.01); *C04B 35/111* (2013.01); *C04B 35/119* (2013.01);
(Continued)

(58) Field of Classification Search
CPC ............ B23B 2224/04; B23B 2226/16; B23C 2224/04; B23C 2226/18
See application file for complete search history.

(56) References Cited

U.S. PATENT DOCUMENTS

2003/0190201 A1* 10/2003 Marusich ................. B23C 3/00
407/54
2004/0148869 A1   8/2004 Celikkaya et al.
(Continued)

FOREIGN PATENT DOCUMENTS

WO   WO 2012/057183 A1   5/2012
WO   WO-2012091535 A1 *  7/2012 ........... B32B 27/148

*Primary Examiner* — Alan Snyder
(74) *Attorney, Agent, or Firm* — Renner, Kenner, Greive, Bobak, Taylor & Weber Co., LPA

(57) ABSTRACT

Cutting tool for machining by removal of matter from abrasive materials such as a material based on wood particles;
tool characterized in that it is composed of a mounting endowed with at least one machining element, and of which at least the machining edge is composed of a high-homogeneity oxide ceramic platelet composed of $Al_2O_3$ and $ZrO_2$, with this platelet being obtained from:
  a homogeneous $Al_2O_3$—XZrO mixture of
    $Al_2O_3$ nano-particles of average size smaller than 1 μm, and
    $ZrO_2$ nano-particles of tetragonal structure and average size smaller than that of the $Al_2O_3$ particles, with the $ZrO_2$ content X being between 5 and 20% in mass of $ZrO_2$ in relation to the total mass, with
  the mixture being formed into a plate via the gel-casting process followed by sintering or controlled cold isostatic compression, and with
  the plate (or platelets resulting from the division of the plate) being mechanically honed to produce the cutting edge.

2 Claims, 1 Drawing Sheet

| Samples | Composition | | Method | Young's modulus [GPa] | Hardness HV10 | Size of grains | | Flexing resistance [MPa] | $K_{Ic}$ [MPa√m] |
|---|---|---|---|---|---|---|---|---|---|
| | $Al_2O_3$ [%m] | $ZrO_2$ [%m] | | | | $Al_2O_3$ [μm] | $ZrO_2$ [μm] | | |
| 8 | 90 | 10 | GC | 382 | 1884 | 0.76 | 0.14 | 716 | 5.6 |

Table : Nominal properties of the ceramic addressed by the invention

(51) Int. Cl.
*C04B 35/111* (2006.01)
*C04B 35/119* (2006.01)
*C04B 35/486* (2006.01)
*C04B 35/488* (2006.01)
*C04B 35/624* (2006.01)

(52) U.S. Cl.
CPC ........ *C04B 35/486* (2013.01); *C04B 35/4885* (2013.01); *C04B 35/624* (2013.01); *B23B 2224/04* (2013.01); *B23C 2224/04* (2013.01); *B23C 2226/18* (2013.01); *C04B 2235/5445* (2013.01); *C04B 2235/604* (2013.01); *C04B 2235/6023* (2013.01); *C04B 2235/785* (2013.01); *C04B 2235/786* (2013.01); *C04B 2235/96* (2013.01)

(56) References Cited

U.S. PATENT DOCUMENTS

| | | | | |
|---|---|---|---|---|
| 2012/0208006 | A1* | 8/2012 | Okamura | B23B 27/148 428/328 |
| 2012/0329632 | A1* | 12/2012 | Malik | C04B 35/5611 501/87 |
| 2013/0079215 | A1* | 3/2013 | Okamura | C04B 35/117 501/87 |

* cited by examiner

| Samples | Composition [%m] | | Method | Young's modulus [GPa] | Hardness HV10 | Size of grains [μm] | | Flexing resistance [MPa] | Toughness $K_{Ic}$ [MPa√m] |
|---|---|---|---|---|---|---|---|---|---|
| | $Al_2O_3$ | 3Y-$ZrO_2$ | | | | $Al_2O_3$ | $ZrO_2$ | | |
| 1 | 100 | | GC | 400 | 2009 | 0.81 | | 661 | 3.6 |
| 2 | 100 | | CIP | 339 | 1808 | 1.03 | | 186 | 3.5 |
| 3 | | 100 | GC | 214 | 1300 | | 0.50 | 1088 | 11.5 |
| 4 | | 100 | CIP | 215 | 1304 | | 0.40 | 1416 | 14.4 |
| 5 | 20 | 80 | CIP | 256 | 1479 | 0.23 | 0.38 | 1708 | 12.7 |
| 6 | 90 | 10 | CIP | 326 | 1727 | 0.75 | 0.14 | 190 | 3.8 |
| 7 | 84 | 16 | CIP | 372 | 1744 | 1.83 | 0.59 | 412 | 5.2 |

Table : Nominal properties of different compositions of sub-micron oxide ceramics developed for the machining of of wood-based abrasive materials

FIG. 1

| Samples | Composition [%m] | | Method | Young's modulus [GPa] | Hardness HV10 | Size of grains [μm] | | Flexing resistance [MPa] | $K_{Ic}$ [MPa√m] |
|---|---|---|---|---|---|---|---|---|---|
| | $Al_2O_3$ | $ZrO_2$ | | | | $Al_2O_3$ | $ZrO_2$ | | |
| 8 | 90 | 10 | GC | 382 | 1884 | 0.76 | 0.14 | 716 | 5.6 |

Table : Nominal properties of the ceramic addressed by the invention

FIG. 2

CUTTING TOOL FOR MACHINING ABRASIVE MATERIALS, NOTABLY WOOD-BASED MATERIALS

DOMAIN OF THE INVENTION

The invention herein pertains to a cutting tool for machining by removal of matter from abrasive materials, such as wood-based composite materials.

The invention notably applies to the production of oxide ceramic cutting platelets intended for the machining of abrasive materials, such as wood-based composite materials.

STATE OF THE ART

For the description of the state of the art, reference will be made to the documents cited in the list at the end of the description.

Machining by removal of chips of abrasive composite materials—notably those based on particles and fibers of wood—gives rise to a mode of wear for the materials most commonly used for these operations, through:

tribo-chemical reaction: the abrasion cycle increases the temperature and promotes the corrosion of the cutting edges. Two separate phenomena have been studied:

the abrasion of the cutting edge of the tool in materials such as tungsten carbide and high-speed steels, covered in document [10];

the high-temperature corrosion observed in document [1] for tools made of WC tungsten carbide, and for steels in accordance with documents [2] [3]. These scientific studies show the vulnerability of cutting tools made of metal or incorporating metal binder to the phenomenon of corrosion, which renders the matrix fragile and promotes the detachment of grains through oxidation.

Micro-cracking:

It occurs under the stresses of machining; the edge fragments [4]

Electrical discharges:

These affect steel tools, as explained notably in the study [5].

But no general wear mechanism has been identified and, accordingly, no particular chemical composition specific to this application has been found.

Ceramics, which have mechanical and chemical resistance properties at high temperature, have been studied for the cutting of these abrasive materials generating corrosion. Several works have covered machining trials with oxide [6] and nitride [7] ceramics.

As oxide ceramics have the advantage of not being susceptible to oxidation—unlike nitride-based compounds—various ceramic platelets have been produced based on oxides of which the physical characteristics analyzed are shown in the appended table (FIG. 1).

This comparative table lists 7 different compositions of oxide ceramics based on $Al_2O_3$ and/or $3YZrO_2$, combined at different weighting percentages and resulting from different production processes, so than one can compare the physical characteristics:

density;
hardness Hv;
size of grains;
flexing resistance;
toughness.

The data highlight the very wide diversity of these physical characteristics, but do not allow deduction of wear resistance when these ceramics are the material of platelets used for machining abrasive or highly-abrasive materials.

Pure $Al_2O_3$ ceramic has the greatest hardness, which would allow one to expect the best wear resistance from it.

The same would apply to ceramics in $3Y—ZrO_2$ or $Al_2O_3$ alumina with a high content of $3Y—ZrO_2$, which have an excellent toughness and, therefore, a high resistance to cracking and breakage.

A comparison of performance and wear with samples respectively composed of $Al_2O_3$-$10(3Y—ZrO_2)$ and $Al_2O_3$-$16(3Y—ZrO_2)$, which also contain zircon $ZrO_2$, in a partially stabilized form, show that this partially stabilized form does not improve the resistance to wear by abrasion.

To sum up, machining with standard ceramics possessing defects, and scientific works [8] have shown that wear occurs principally via cracking of the cutting edge.

Machining trials with platelets having one of compositions 1 to 7 in table 1 have shown that they had a very short working life, notwithstanding their seemingly-advantageous characteristics. This working life of the tools was not satisfactory in comparison with that of tools made of polycrystalline diamond.

This is true for these platelets in ceramic with nano-particles produced according to the gel-casting process or a cold isostatic compression (CIP) process.

A microscopic examination of machining platelets has shown that all these platelets made of nano-particle compositions are fragile, and the cutting edges chip or crack and quickly lose their effectiveness.

PURPOSE OF THE INVENTION

The purpose of the invention herein is to develop a cutting tool for the machining of abrasive materials, incorporating machining cutting platelets made of oxide ceramic having a good resistance to wear while being less costly to manufacture than tools with polycrystalline diamond platelets.

EXPLANATION AND ADVANTAGES OF THE INVENTION

Thus, the invention addresses a cutting tool for machining by removal of abrasive materials, such as a material based on wood particles, with this tool being characterized in that it consists of a mounting endowed with at least one machining element and of which the machining edge is composed of a oxide ceramic platelet of high homogeneity, composed of $Al_2O_3$ and $ZrO_2$, with this platelet being obtained from a homogenous $Al_2O_3$—$XZrO$ mixture with $Al_2O_3$ nano-particles of an average size smaller than 1 μm, and $ZrO_2$ nano-particles with a tetragonal structure and an average size that is smaller than that of the $Al_2O_3$ particles, with the $ZrO_2$ content X being between 5 and 20% mass of $ZrO_2$ in relation to the total mass, with the mixture being formed into a plate via the gel-casting process followed by sintering or controlled cold isostatic compression, and with the plate (or platelets resulting from the division of the plate) being mechanically honed to produce the cutting edge.

The cutting tool according to the invention has excellent resistance to wear by abrasion, for machining through removal of chips from abrasive materials such as wood-based particle or fiber panels.

According to one advantageous characteristic of the machining tool, the average dimension of the $ZrO_2$ particles is smaller than 0.5 μm.

One observes no chipping or cracking of the cutting edge, which conserves its form and, therefore, its sharpness. The only wear observed is wear by abrasion, namely removal of nano-particles, which are detached from the ceramic mass. However, this abrasion retains the form of the cutting edge, so that the tool still possesses its excellent cutting characteristics.

Because the tool according to the invention is manufactured in accordance with a simple process that does not require any complex installations, it is cost-effective to produce. The simplicity of the production process—through molding a plate via the gel-casting process followed by sintering, or via the CIP process, followed by cutting the plate into platelets and sharpening the cutting edge of each platelet—reduces the number of rejected parts, which consequently increases the financial advantageousness of the process and reduces the cost of the product (cutting platelet). It also has a consequence for the cutting tool, of which the worn platelets can be replaced easily and quickly.

The cutting tool with oxide ceramic platelets according to the invention has a considerably-improved overall wear resistance because:

the phase transformation under stresses and a temperature rise linked to the process of machining of the cutting edge and, also, the machining of the abrasive material by removal of chips develops a better micro-mechanical stability of the inter-granular bindings of the oxide ceramic platelets;

the platelets have a greater hardness and, therefore, a better resistance to the plastic micro-distortions of the micro-structure and the detachment of grains;

the platelets have few defects, which restricts the influence of their intrinsically-fragile nature;

the cutting edge is finer because of the nano-particles.

DRAWINGS

The invention herein will be described hereafter in a more-detailed manner by means of an example of manufacture of a machining tool via removal of material, based on the tables of the physical characteristics of different oxide ceramics; thus:

FIG. 1 is a table presenting the physical characteristics of 7 samples of $Al_2O_3$- and $3YZ_rO_2$-based oxide ceramic;

FIG. 2 is a table of these same physical characteristics of a cutting platelet made of a combination of $Al_2O_3$ and $ZrO_2$ in accordance with the invention.

DESCRIPTION OF METHODS OF IMPLEMENTATION OF THE INVENTION

The invention addresses a cutting tool for the machining of abrasive materials. This tool is composed of a mounting for installing the tool in the machine. The mounting accommodates one or more cutting platelets, which are what comes into contact with the material to be machined. The cutting platelets are made of a oxide ceramic of alumina $Al_2O_3$ and zircon $ZrO_2$, according to a mass ratio of 5 to 20% of zircon in the total mass.

The alumina $Al_2O_3$ and zircon $ZrO_2$ are in the state of nano-particles (sub-micron particle size). The $Al_2O_3$ particles are of less than one micron in size, while the $ZrO_2$ particles are smaller than the alumina $Al_2O_3$ particles and, preferably, smaller than 0.5 μm. The $ZrO_2$ particles are regularly distributed throughout the mass of alumina $Al_2O_3$ particles. The $ZrO_2$ particles initially have the crystalline structure of a tetragonal network. The homogenous mixture of particles is used for producing oxide ceramic plates via the gel-casting process, which conserves this homogenous distribution. The molding of the plate via the gel-casting process is followed by a baking (sintering).

Trials undertaken with platelets (gel-casting plus sintering) have shown that the cutting edge resulting from molding alone did not have particular strength, and suffered chipping or cracking of the cutting edge.

According to the invention, the ceramic plate obtained via the gel-casting process and sintered is then cut into platelets of the desired dimensions, according to the cutting tool. The cutting plate(s) are secured to a metal mounting, which is itself then secured to the tool's mounting.

The tool is sharpened in a subsequent phase, to produce the cutting edge of the platelets. Under the effect of the machining of the platelet and of its cutting edge, the $ZrO_2$ particles increase in volume, changing from the structure of a tetragonal network to that of a mono-clinical network, as has been shown by microscopic examinations before and after the machining in the mounted state. This is because while, before the machining of the cutting edge, the ceramic only presented a very small transformation (around 1 to 2%) of the incorporated zircon, which changed from the tetragonal state to the mono-clinical state; after machining, the cutting edge had undergone a major transformation in structure.

The mechanical honing of the cutting edge gives rise to strong mechanical stresses in the structure. These stresses can be assimilated to a pressure that—when combined with the high temperature rise produced by the mechanical honing—causes the change of phase of the $ZrO_2$ nano-particles from the tetragonal structure to the mono-clinical structure.

Furthermore, this increase in volume is then further amplified by the work with the tool, namely the machining of the abrasive material, as was shown by microscopic examinations.

The change of structure gives rise to an increase in the volume of the $ZrO_2$ particles, which thereby exert internal stresses on the $Al_2O_3$ particles, and block them. These micro-compression stresses in the micro-structure considerably improve the micro-mechanical strength of the joins of grains. The same result is obtained with platelets manufactured in accordance with the controlled CIP (cold isostatic compression) process, because the tetragonal structure of $ZrO_2$ grains is no longer transformed into a mono-clinical structure except by the gel-casting process followed by sintering. Therefore, the invention results from the specific composition of $Al_2O_3$—$XZrO_2$ oxide ceramics (with 5<X<20% m.) manufactured via a process restricting the population of defects, such as the gel-casting process or the CIP process with preparation of the powder before sintering. The result is a notable improvement in the resistance of grains to detachment and, therefore, to wear by abrasion during the machining of abrasive materials by an identified grain micro-compression mechanism.

DOCUMENTARY REFERENCES

[1] Porankiewicz B. Tribochemical reactions of cutting-edge material during secondary wood-product cutting. Tribol Lett 2002; 13:141-5.

[2] Porankiewicz B, Chamot E. Tribochemical reactions of steel in cutting edge material during secondary wood products cutting. Tribol Lett 2005; 19:73-82.

[3] Mohan G D, Klamecki B E. The susceptibility of wood-cutting tools to corrosive wear. Wear 1981; 74:85-92. doi:10.1016/0043-1648(81)90195-2.

[4] Miklaszewski S, Zurek M, Beer P, Sokolowska A. Micromechanism of polycrystalline cemented diamond tool wear during milling of wood-based materials. Diam Relat Mater 2000; 9:1125-8. doi:10.1016/S0925-9635 (99)00370-2.
[5] Stewart H A, Srinivasan S, Kent Stiffler A, Miller D B. Electrical discharge when machining medium-density fibreboard and tool wear. Tribol Int 1994; 27:343-8. doi:10.1016/0301-679X(94)90028-0.
[6] Gogolewski P, Klimke J, Krell A, Beer P. $Al_2O_3$ tools towards effective machining of wood-based materials. J Mater Process Technol 2009; 209:2231-6. doi:10.1016/j.jmatprotec.2008.06.016.
[7] Eblagon F, Ehrle B, Graule T, Kuebler J. Development of silicon nitride/silicon carbide composites for wood-cutting tools. J Eur Ceram Soc 2007; 27:419-28.
[8] Sommer F, Talpeanu D, Kern F, Gadow R, Heisel U. Medium Density Fiberboard Machining and Wear Behavior of Injection-Molded Ceramic Composite Wood Cutting Tools. Int J Appl Ceram Technol 2015; 12:147-56. doi:10.1111/ijac.12144.
[9] Evans A g., Faber K t. Crack-Growth Resistance of Microcracking Brittle Materials. J Am Ceram Soc 1984; 67:255-60. doi:10.1111/j.1151-2916.1984.tb18842.x.
[10] McKenzie, Karpovich. Wear and blunting of the tool corner in cutting a wood-based material. Wood Science and Technology 1975; 9:59-73

The invention claimed is:
1. Cutting tool for machining by removal of matter from abrasive materials, including material based on wood particles;
tool characterized in that it is composed of a mounting endowed with at least one machining element, and of which at least the machining edge is composed of a high-homogeneity oxide ceramic platelet composed of $Al_2O_3$ and $ZrO_2$, with this platelet being obtained from:
a homogenous $Al_2O_3$—XZrO mixture of
$Al_2O_3$ nano-particles of average size less than 1 μm, and
$ZrO_2$ nano-particles of tetragonal structure and average size smaller than that of the $Al_2O_3$ particles,
with the $ZrO_2$ content X being between 5 and 20% of mass of $ZrO_2$ in relation to the total mass;
with the mixture being formed into a plate via the gel-casting process, followed by sintering or controlled cold isostatic compression, and
with the plate (or platelets resulting from the division of the plate) being mechanically honed to produce the cutting edge.
2. Machining tool in accordance with claim 1, characterized in that the average $ZrO_2$ particle is smaller than 0.5 μm.

* * * * *